United States Patent
Benedetti et al.

(10) Patent No.: US 9,591,074 B2
(45) Date of Patent: Mar. 7, 2017

(54) MONITORING RESOURCES IN A CLOUD-COMPUTING ENVIRONMENT

(75) Inventors: Fabio Benedetti, Rome (IT); Antonio Di Cocco, Rome (IT); Claudio Marinelli, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 13/493,917

(22) Filed: Jun. 11, 2012

(65) Prior Publication Data

US 2013/0007265 A1    Jan. 3, 2013

(30) Foreign Application Priority Data

Jun. 30, 2011   (IT) .............................. MI2011A1209

(51) Int. Cl.
| | |
|---|---|
| *G06F 15/173* | (2006.01) |
| *H04L 29/08* | (2006.01) |
| *G06F 9/50* | (2006.01) |
| *G06F 11/30* | (2006.01) |
| *H04L 29/06* | (2006.01) |

(52) U.S. Cl.
CPC ........ *H04L 67/1097* (2013.01); *G06F 9/5072* (2013.01); *G06F 11/302* (2013.01); *G06F 11/3006* (2013.01); *G06F 11/3093* (2013.01); *H04L 69/02* (2013.01); *G06F 2209/508* (2013.01)

(58) Field of Classification Search
CPC ............. H04L 12/4641; H04L 63/0272; H04L 29/06612; H04L 12/4645; G06F 15/173; G06F 9/45533; G06F 9/5077; G06F 2009/45533; G06F 2201/815
See application file for complete search history.

(56) References Cited

U.S. PATENT DOCUMENTS

2003/0120775 A1* 6/2003 York ................... H04L 12/2602 709/224
2003/0167153 A1* 9/2003 Alexander .................... 702/189
(Continued)

OTHER PUBLICATIONS

Di Cocco et al., "Method and System for User Level Notifications on Virtual Machine Health, in a Cloud Computing Infrastructure", IBM Memo, dated Dec. 2010, pp. 1-7.

*Primary Examiner* — Mohamed Wasel
*Assistant Examiner* — Tsung Wu
(74) *Attorney, Agent, or Firm* — David W. Victor; Konrad, Raynes, Davda and Victor LLP (57) ABSTRACT

Provided are a computer program product, system, and method for monitoring resources in a cloud computing environment. A set of cloud resources is provisioned to a user of the cloud-computing environment. A set of private resources is provided for the user, each private resource being provisioned within the set of cloud resources of the user. Monitoring templates are exposed, each one for a corresponding type of a private resource to the user. A user subscription is received to at least one of the monitoring templates, wherein each of the subscribed monitoring templates is for one of the user private resources. A private monitoring agent is provided within the cloud resources of the user housing the private resource of the user to monitor the private resource according to the corresponding selected monitoring template.

25 Claims, 6 Drawing Sheets

(56) References Cited

U.S. PATENT DOCUMENTS

| | | | |
|---|---|---|---|
| 2005/0182750 A1* | 8/2005 | Krishna et al. | 707/1 |
| 2006/0247965 A1* | 11/2006 | Griffith | G06Q 10/067 |
| | | | 705/348 |
| 2007/0168349 A1* | 7/2007 | Sanghvi | G06F 3/0484 |
| 2009/0024994 A1* | 1/2009 | Kannan | G06F 9/45533 |
| | | | 718/1 |
| 2009/0276771 A1* | 11/2009 | Nickolov et al. | 717/177 |
| 2010/0049851 A1* | 2/2010 | Garrison et al. | 709/226 |
| 2010/0088150 A1 | 4/2010 | Mazhar et al. | |
| 2011/0055385 A1* | 3/2011 | Tung et al. | 709/224 |
| 2011/0231899 A1* | 9/2011 | Pulier et al. | 726/1 |
| 2012/0084413 A1* | 4/2012 | Pasternak | 709/221 |
| 2012/0089980 A1* | 4/2012 | Sharp | G06F 9/45558 |
| | | | 718/1 |

* cited by examiner

MONITORING RESOURCES IN A CLOUD-COMPUTING ENVIRONMENT

CROSS-REFERENCE TO RELATED FOREIGN APPLICATION

This application is a non-provisional application that claims priority benefits under Title 35, United States Code, Section 119(a)-(d) from Italian Patent Application entitled "USER-LEVEL MONITORING IN A CLOUD-COMPUTING ENVIRONMENT" by Antonio DICOCCO, Luigi PICHETTI, Claudio MARINELLI, and Fabio BENEDETTI, having Italian Patent Application No. MI2011A001209, filed on Jun. 30, 2011, which Italian Patent Application is incorporated herein by reference in its entirety.

BACKGROUND OF THE INVENTION

1. Field of the Invention

The present invention relates to a computer program product, system and method for monitoring resources in a cloud computing environment.

2. Description of the Related Art

Cloud computing is a new data-processing model that has become increasingly popular in recent years. In a cloud-computing environment users are allowed to access a pool of shared computing resources (referred to as cloud resources) on-demand, which cloud resources are provisioned, configured and released very rapidly (and then are generally of the virtual type). These cloud resources are supplied by cloud providers, which are accessed through a communication network (whereas their actual implementation is completely opaque to the users).

In this way, the users are relived of the management of the actual physical resources that are needed to implement the cloud resources (for example, their installation and maintenance); particularly. This provides economies of scale, improved exploitation of the physical resources, and high peak-load capacity. Moreover, the users are now allowed to perform tasks (on a pay-per-use basis) that were not feasible previously because of their cost and complexity (especially for individuals or small companies). The de-coupling of the cloud resources from their implementation provides the illusion of an infinite capacity thereof. Moreover, the de-localization of the physical resources implementing the cloud resources enables the users to access them from anywhere.

Monitoring performance of cloud-computing environments is a very common activity. For this purpose, monitoring tools are available to measure usage of their physical resources (such as processing power, mass memory and working memory); examples of commercial monitoring tools available on the market are International Business Machines Corporation ("IBM") products including CLOUDBURST® and SERVICE DELIVERY MANAGER. The information provided by the monitoring tools is very useful for administrators of the cloud-computing environments. Particularly, the administrators may get instantaneous notifications when any problem is experienced (so that appropriate steps may be taken to remedy the situation). Moreover, the collected information may be logged for tracking over time (for example, for charge-back accounting, service level agreement verification and capacity planning) (CLOUDBURST® and SERVICE DELIVERY MANAGER are trademarks of IBM in the United States and other countries).

However, these monitoring tools may only be available to the administrators of the cloud-computing environments. The provision of the same monitoring tools to the users is not feasible in practice because since they are designed to provide complete access to all the physical resources of the cloud-computing environments and such tools would not be of interest to users since the users are not interested in this kind of information.

United States Patent Publication No. 2010/0088150 (the entire disclosure of which is herein incorporated by reference) discusses a cloud-computing environment wherein each user may configure special monitoring/alert requests (for example, when a firewall rule is breached, or when an average processing power exceeds a threshold value for a given time in a given tier) through a user interface or a configuration file. The cloud-computing environment is then monitored accordingly (for example, by means of corresponding agents), so as to generate events that trigger the delivering of corresponding user notifications via different means (for example, via e-mail or SMS).

United States Patent Publication No. 2011/0055385 (the entire disclosure of which is herein incorporated by reference) discloses the possibility of monitoring the cloud resources (for example, when they change in status or when their usage reaches a predefined threshold) in response to corresponding user requests entered with a Graphical User Interface (GUI). The collected information may also be organized per user or project when the same cloud resources are shared among multiple users or projects. This information may be used to track the usage of the cloud resources, particularly on a per-user or per-project basis, or to send corresponding notifications to the users.

However, the above-mentioned techniques only allow monitoring cloud resources that are under the direct control of the cloud-computing environment such as the virtual machines). Information about the internal behavior of these cloud resources may not be collected because it is only accessible to the corresponding users. Therefore, the above mentioned techniques do not provide comprehensive information at the user-level making it difficult for the users to detect real problems and to investigate their causes. For example, the users may not be able to ascertain the health of critical software applications running on their virtual machines such as whether they have been started or they are in hang, whether an excessive usage of resources of a virtual machine is due to an actual problem of a software application running thereon or simply to a load peak, and the like.

SUMMARY

Provided are a computer program product, system, and method for monitoring resources in a cloud computing environment. A set of cloud resources is provisioned to a user of the cloud-computing environment. A set of private resources is provided for the user, each private resource being provisioned within the set of cloud resources of the user. Monitoring templates are exposed, each one for a corresponding type of a private resource to the user. A user subscription is received to at least one of the monitoring templates, wherein each of the subscribed monitoring templates is for one of the user private resources. A private monitoring agent is provided within the cloud resources of the user housing the private resource of the user to monitor the private resource according to the corresponding selected monitoring template.

BRIEF DESCRIPTION OF THE DRAWINGS

The solution according to one or more embodiments of the invention, as well as further features and the advantages thereof, will be best understood with reference to the following detailed description, given by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

The described embodiments concern monitoring the cloud resources at the user level.

Described embodiments provide a monitoring method for use in a cloud-computing environment. As part of the method, a set of cloud resources (for example, virtual machines) is provisioned to each one of a set of users of the cloud-computing environment. A set of private resources is provided by each user; each private resource is housed within a cloud resource of the user (for example, a software application running on a virtual machine thereof). A set of monitoring templates, each one for a corresponding type of resource, is exposed to the users (for example, each one defining a type of monitoring event to be monitored—such as a change of status or the reaching of a threshold value by a metric of the corresponding type of cloud and/or private resource). The method continues subscribing to a set of selected monitoring templates by each one of a set of selected users. Each selected monitoring template is subscribed for a selected resource of the selected user corresponding to the type of resource of the selected monitoring template, such as for a specific instance of a software application. A private monitoring agent within each cloud resource housing at least one selected private resource, such as within a virtual machine wherein a selected software application runs, then monitors each of said at least one selected private resource according to the corresponding selected monitoring template. This monitoring may notify the corresponding user according to a predefined notification template associated with the monitoring template when a corresponding monitoring event is raised.

In further embodiments, a computer program comprising code means causes a data-processing system (for example, a cloud provider) to perform the steps of this method when the computer program is executed on the data-processing system.

Further embodiments provide a computer program product comprising a non-transitory computer readable medium embodying a computer program, the computer program comprising code means directly loadable into a working memory of a data-processing system thereby configuring the data-processing system to perform the same method.

In a further embodiment, a system (for example, a cloud provider) performs the monitoring method embodiment.

Figure 1:
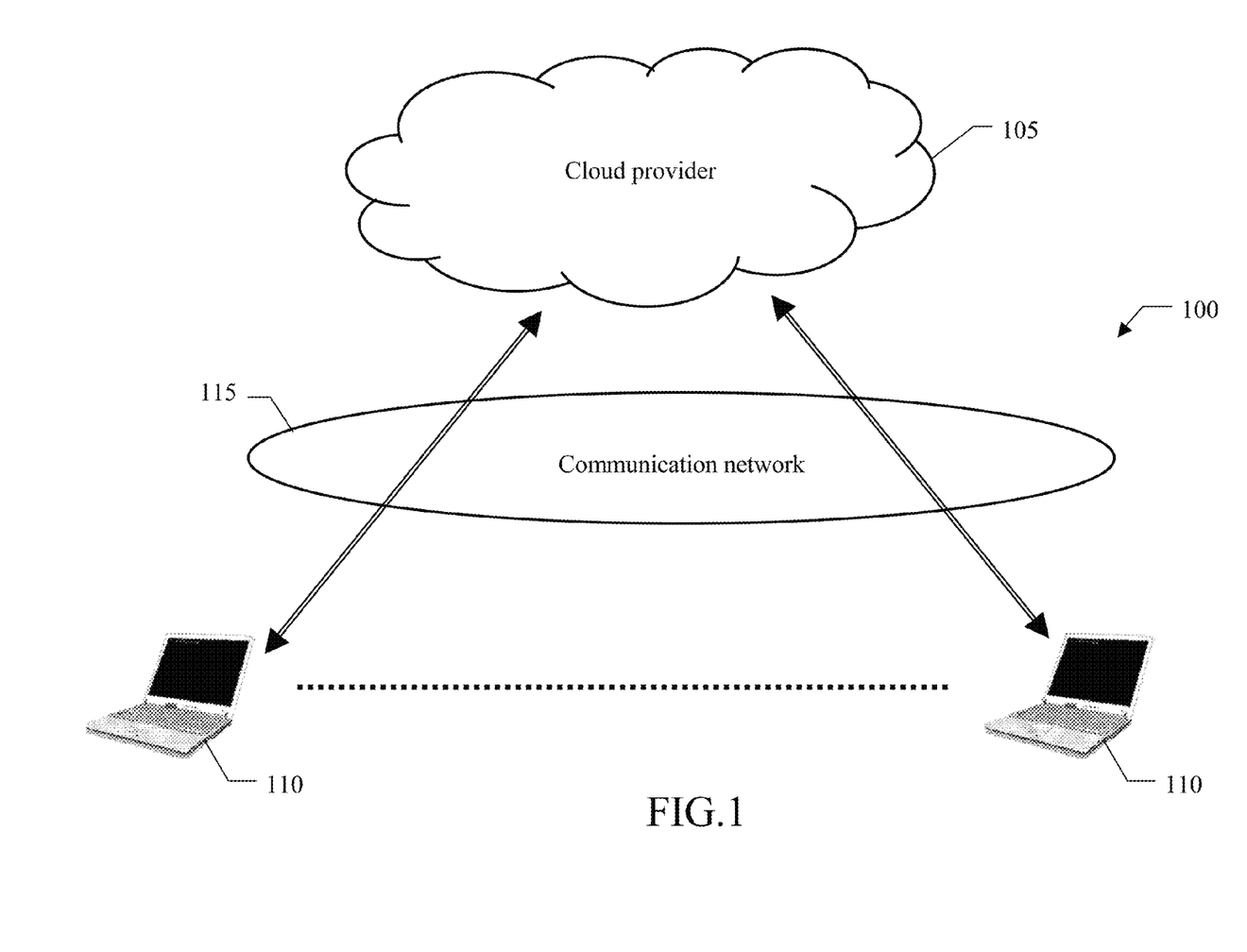
FIG. 1 shows a pictorial representation of a cloud-computing environment in which embodiments are applicable.

With reference in particular to the FIG. 1, a pictorial representation is shown of a cloud-computing environment 100. The cloud-computing environment 100 comprises one or more cloud providers 105 (only one shown in the figure for the sake of simplicity). Each cloud provider 105 is an entity that makes available a pool of cloud resources on-demand (i.e., shared computing resources that may be provisioned, configured and released very rapidly). These cloud resources are generally of the virtual type (i.e., emulations by software of physical resources). For example, the cloud resources may comprise virtual machines, Software As a Service (SAS) facilities (i.e., software applications supplied on-demand), Platform as a Service (PaaS) facilities (i.e., virtual machines with software applications running thereon), virtual storage devices, virtual network resources, Infrastructure as a Service (IaaS) facilities (i.e., implementations of complete virtual data centers), on-line services, or any combinations thereof. Each user has the sole control of his/her cloud resources, which may then be used exactly as if they were dedicated physical resources. For instance, the user may provide his/her own private resources that are housed in these cloud resources and are not visible to anyone else in the cloud-computing environment 100 (for example, operating systems and software applications running on virtual machines, data-bases stored therein, or any combinations thereof).

The cloud provider 105 has a front-end component that is exposed to users of the cloud provider 105 for accessing the desired cloud resources (either for personal purposes or for providing services to third parties). The cloud resources are actually implemented by a back-end component of the cloud provider 105. The back-end component of the cloud provider 105 may comprise a pool of physical server computers (or simply servers) and storage devices being loosely coupled to each other, with a redundant architecture to ensure the required reliability level (with the servers and the storage devices that in turn may be implemented by cloud resources as well). The back-end component of the cloud provider 105 may not be accessible from the outside, so that the users may be unaware of the actual location and configuration thereof.

Each user may exploit selected cloud resources of the cloud provider 105 by means of a corresponding client computer (or simply client) 110. The client 110 may be of the thin type (such as a netbook, a tablet computer or a Smartphone), since the required computational and storage capabilities are supplied by the cloud provider 105. For this purpose, the client 110 accesses the cloud provider 105 through a communication network 115. Generally, the cloud-computing environment 100 is public (wherein the cloud provider 105 is implemented by a third party that bills the users on a pay-per-use basis, and it is accessed through the Internet). Alternatively, it is also possible to have a cloud-computing environment 100 of private type (wherein the cloud provider 105 is implemented internally and it is accessed through a company LAN), of community type (established by multiple companies for their exclusive use), or of hybrid type (based on a combination of a public cloud environment and a private cloud environment).

Figure 2:
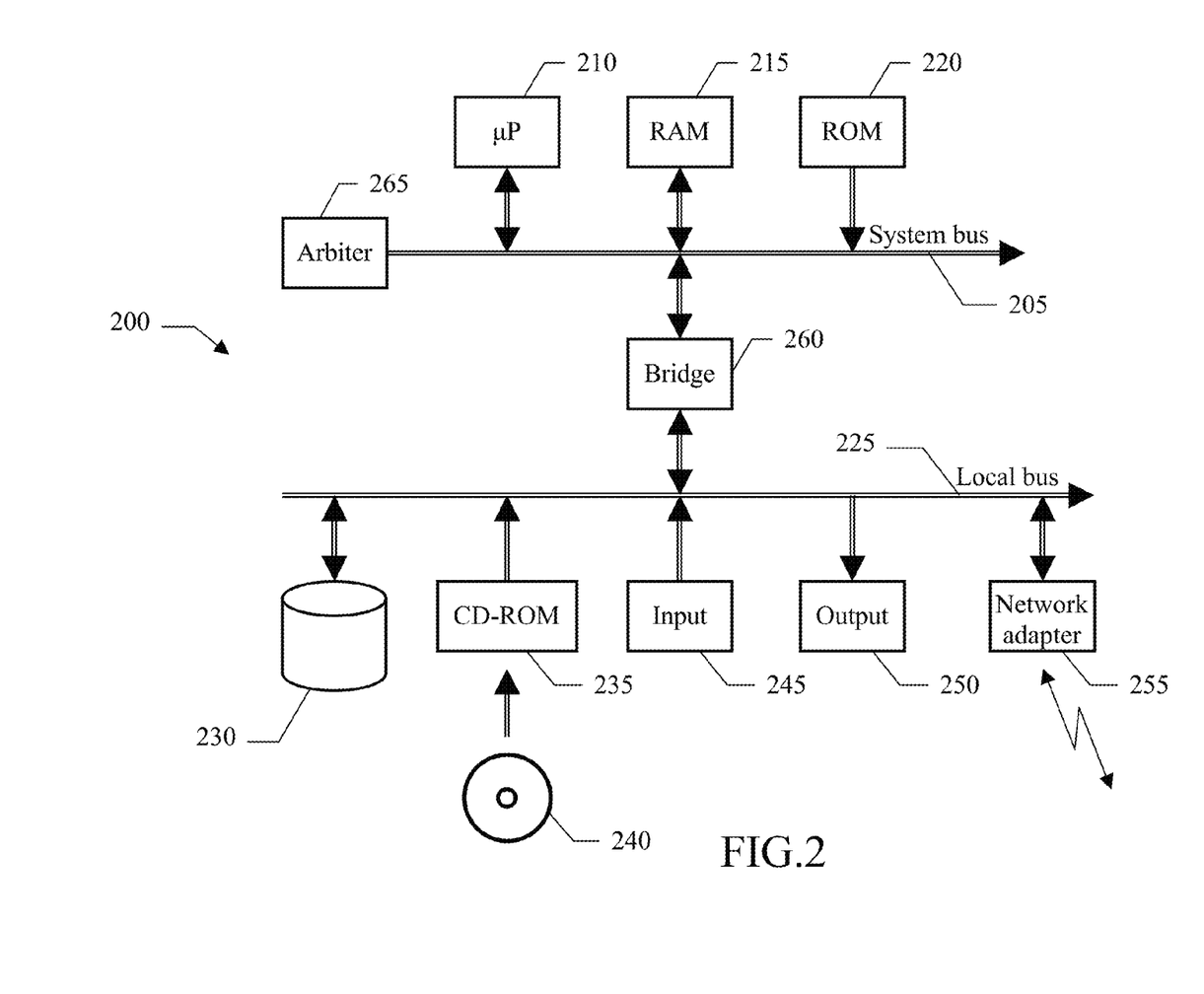
FIG. 2 shows a schematic block diagram of a generic computer of this cloud-computing environment.

FIG. 2 provides a schematic block diagram of a generic computer 200 of this cloud-computing environment. The computer 200 is formed by several units that are connected in parallel to a system bus 205 (with a structure that is suitably scaled according to the actual function of the computer 200 in the cloud-computing environment). One or more microprocessors (μP) 210 control operation of the computer 200. A RAM 215 is used as a working memory by the microprocessors 210 and a ROM 220 stores basic code for a bootstrap of the computer 200. Several peripheral units are clustered around a local bus 225 by means of respective interfaces. Particularly, a mass memory comprises one or more hard disks 230 and drives 235 for reading DVD- or CD-ROMs 240. Moreover, the computer 200 comprises input units 245 (for example, a keyboard and a mouse), and output units 250 (for example, a monitor and a printer). A network adapter 255 is used to plug the computer into the cloud-computing environment. A bridge unit 260 interfaces the system bus 205 with the local bus 225. Each microprocessor 210 and the bridge unit 260 may operate as master agents requesting an access to the system bus 205 for transmitting information. An arbiter 265 manages the granting of the access with mutual exclusion to the system bus 205.

Figure 3A:
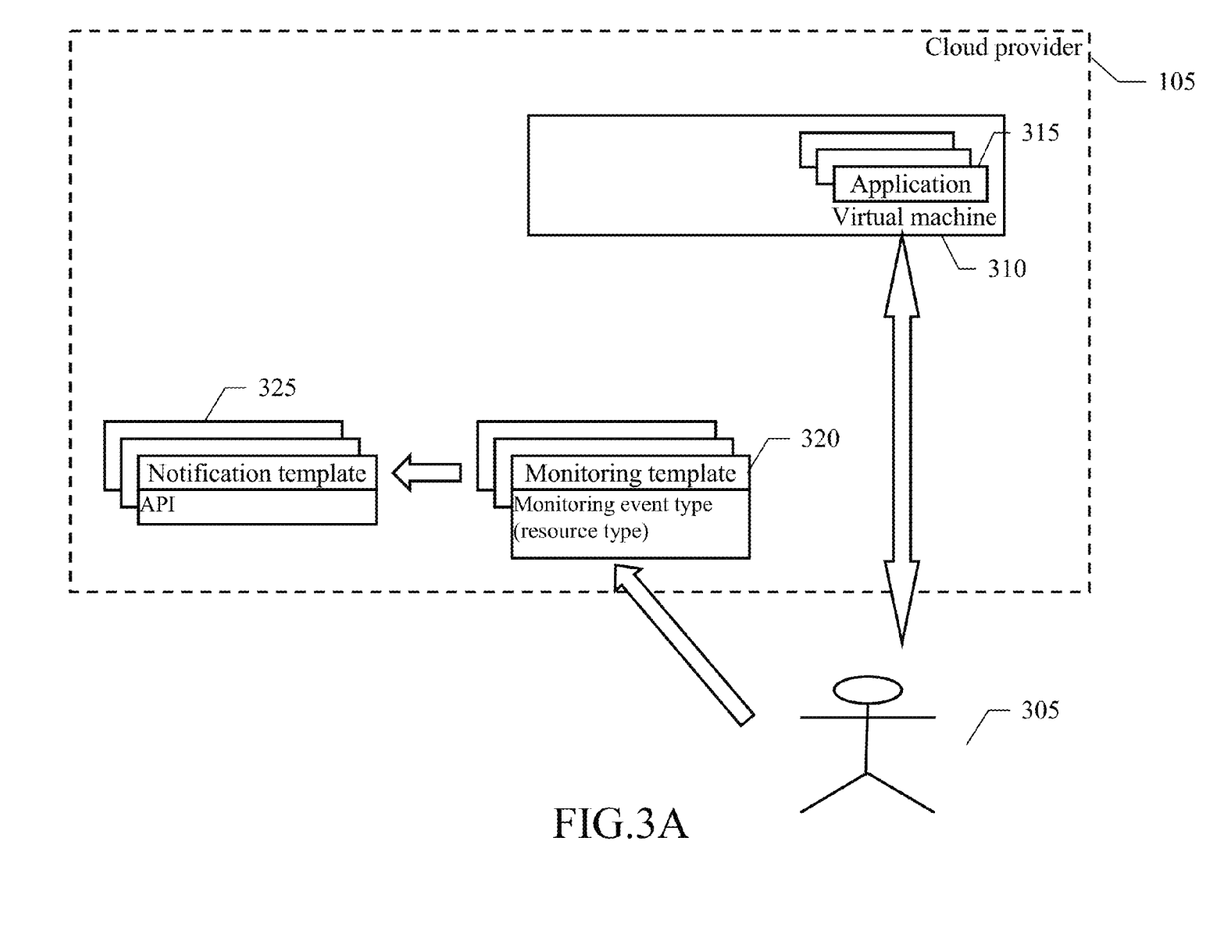
FIG. 3A-FIG. 3C show an exemplary scenario of application of the described embodiments.
Figure 3B:
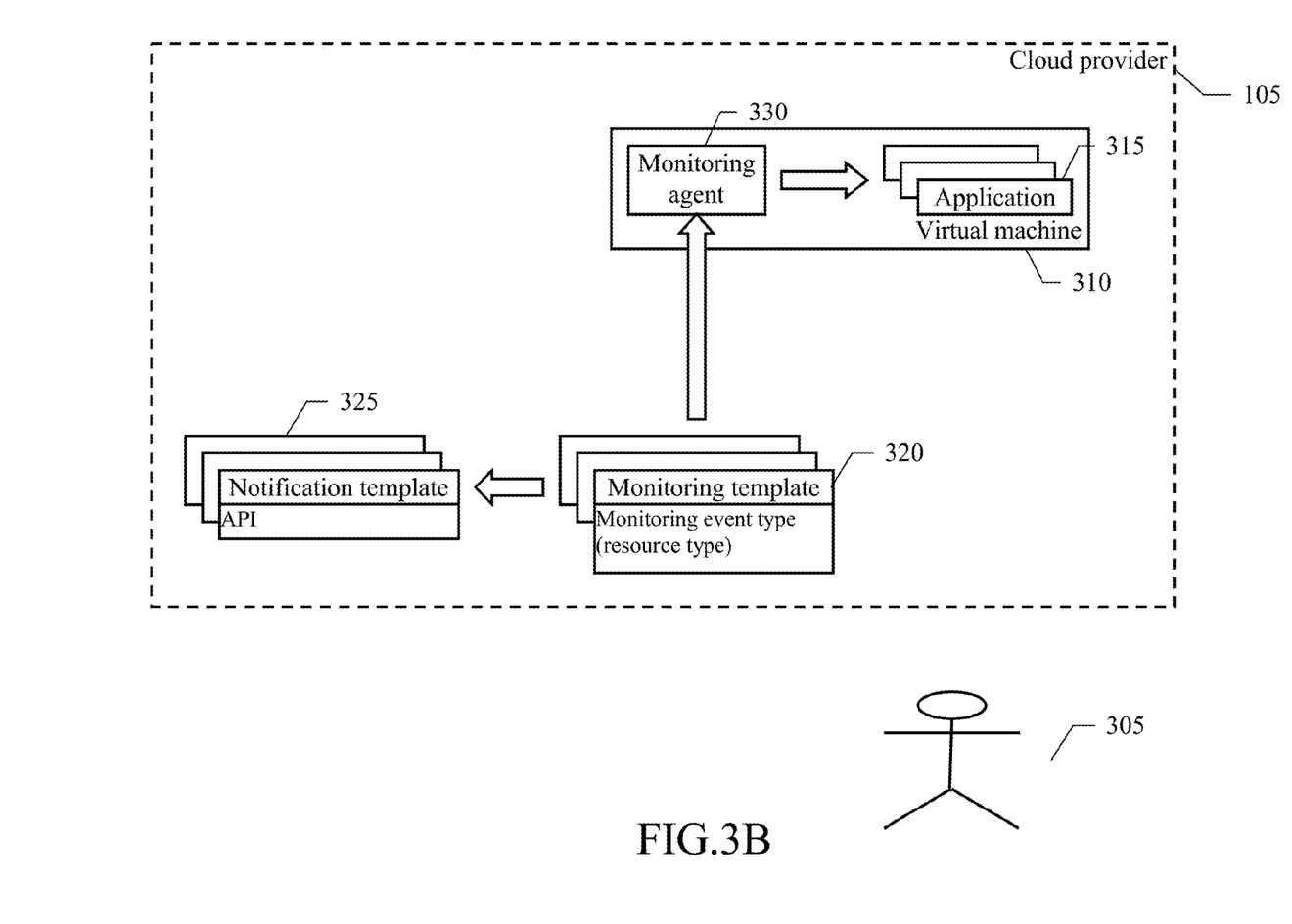
Figure 3C:
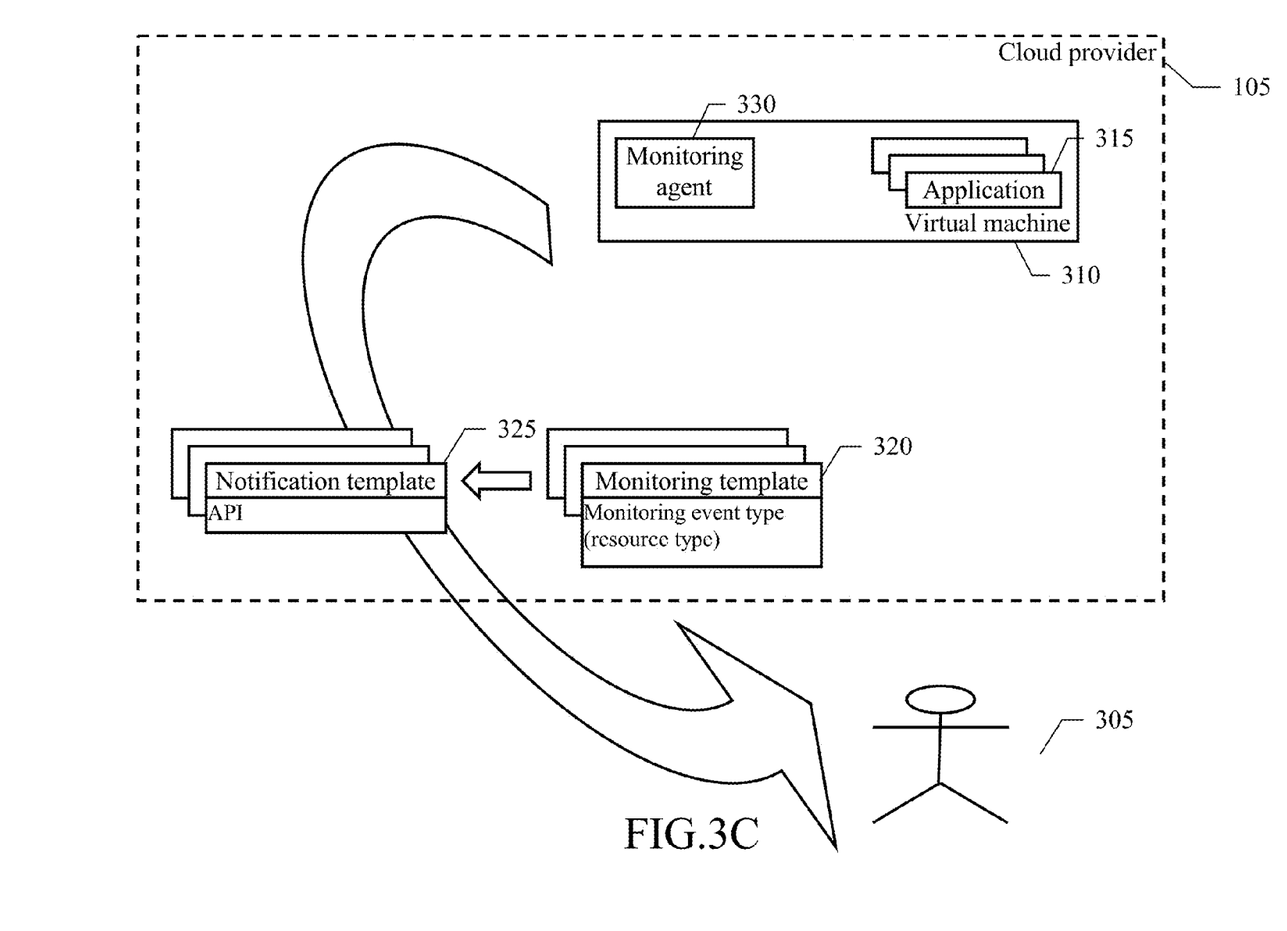

An exemplary scenario of application of the described embodiments is shown with respect to FIG. 3A-FIG. 3C.

With respect to FIG. 3A, a generic user 305 accesses corresponding virtual machines 310 (or other cloud resources) that are provisioned by the cloud provider 105. The user 305 may then install and configure software applications 315 within the virtual machines 310 (or provide any other private resources housed therein).

The cloud provider 105 exposes a set of monitoring templates 320 each one for a type of private resource (such as software applications). Each monitoring template 320 may define a type of monitoring event to be monitored for its type of resource, such as when a software application changes its status or when a metric thereof (such as the usage of the processing power, mass memory or working memory of the corresponding virtual machine) reaches a threshold value. The user 305 may then subscribe to one or more monitoring templates 320 for resources 310,315 of the corresponding type. As a further improvement, each monitoring template 320 is associated with a notification template 325, which defines a format to be used to inform the user 305 when a corresponding monitoring event has been raised—for example, according to a predefined Application Program Interface (API).

For each monitoring template 320 that has been subscribed by the user 305 (for a software application 315), as shown in the FIG. 3B, the cloud provider 105 monitors this software application 315 according the corresponding monitoring template 320 (i.e., to detect any occurrence of the corresponding monitoring event). For this purpose, a monitoring agent 330 may be injected within the virtual machine 310. The monitoring agent 330 is then configured to monitor the software application 315 accordingly—for example, to check the status of the software application 315 for detecting its change, or to measure the desired metric of the software application 315 for detecting the reaching of the corresponding threshold value.

As soon as the monitoring agent 330 raises any monitoring event, as shown in the FIG. 3C, the user is notified accordingly, on the basis of the associated notification template 325 (for example, by means of a corresponding notification message via a REST API).

In this way, it is possible to monitor the internal behavior of the cloud resources (even if it is only accessible to the corresponding users). Therefore, this provides comprehensive information at the user-level to allow the users to detect real problems and investigate their causes. For example, the users may ascertain the health of critical software applications running on their virtual machines (such as whether they have been started or they are in hang), whether an excessive usage of resources of a virtual machine is due to an actual problem of a software application running thereon or simply to a load peak, and the like. Moreover, the above-mentioned monitoring templates provide a general purpose, non multi-tenant solution, which allows each user to monitor only the resources to which the user is entitled and has interest.

In described embodiments, the use of the notification templates ensures that all the users always receive the same type of information for the same type of monitoring events, but with different contents relating to corresponding current values.

Figure 4:
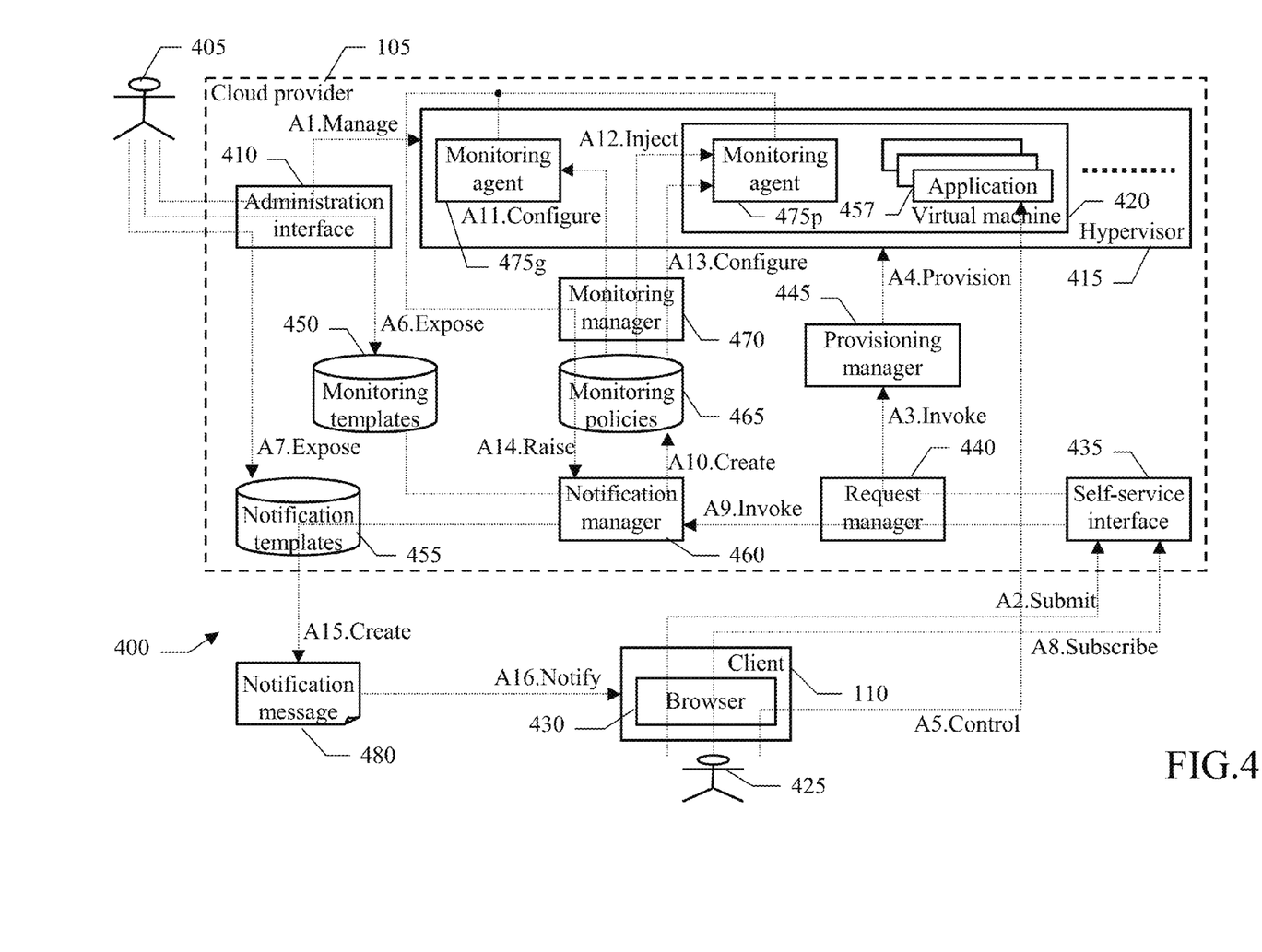
FIG. 4 shows a collaboration diagram representing the roles of the main software components that may be used to implement the described embodiments.

A collaboration diagram representing the roles of the main software components that may be used to implement the described embodiments is shown in FIG. 4. These software components are denoted as a whole with the reference 400. The information (programs and data) is typically stored in the hard disk and loaded (at least partially) into the working memory of each computer when the programs are running, together with an operating system and other application programs (not shown in the figure). The programs are initially installed onto the hard disk, for example, from DVD-ROM. Particularly, the figure describes both the static structure of the software components and their dynamic behavior (by means of a series of exchanged messages, each one representing a corresponding action, denoted with sequence numbers preceded by the symbol "A").

An administrator 405 of the cloud provider 105 may use an administration interface 410 for managing the cloud provider 105 (action "A1.Manage"). For this purpose, the administration interface 410 interacts with a hypervisor 415 (for example, VMware ESX by VMWare, trademarks of VMWare Inc.), which emulates the cloud resources supplied by the cloud provider 105 (such as virtual machines 420). For example, the administrator 405 may control the distribution of the virtual machines 420 throughout the available physical resources for load balancing purposes, may control the provisioning of the physical resources required to implement the virtual machines 420, may monitor the consumption of the physical resources used to implement the virtual machines 420 (such as processing power, mass memory and working memory), and the like.

On the other hand, a user 425 of a generic client 110 exploits an access module 430 to access the cloud provider 105. For example, the access module 430 may be a browser, which is used in general to surf the Internet and in particular to access the cloud provider 105. For this purpose, the cloud provider 105 exposes a self-service interface 435 (for example, implemented with a web portal). The user 425 interacts with the self-service interface 435 through the browser 430 for submitting any desired request to the cloud provider 105. Normally, these requests are for provisioning cloud resources of the user 425 (hereinafter referred to as provisioning requests). For example, the user 425 may request the instantiation of a new virtual machine 420, a change of the configuration thereof, or its deletion (action "A2.Subunit"). Any provisioning request submitted by the user 425 to the self-service interface 435 is forwarded to a request manager 440, which handles its execution. Particularly, for each provisioning request received from the self-service interface 435, the request manager 440 invokes a provisioning manager 445 for performing the corresponding operations (action "A3.Invoke"). In response thereto, the provisioning manager 445 submits corresponding commands to the hypervisor 415 (action "A4.Provision"). At this point, the user 425 (having the sole control of his/her virtual machines 420) may control (i.e., install, configure or delete) private resources being housed in these virtual machines 420—for example, software applications 457 running thereon (action "A5.Control").

The administrator 405 may also use the administration interface 410 for configuring monitoring templates 450 (for example, for injecting, modifying or deleting them). The monitoring templates 450 are stored in a corresponding catalogue, which is exposed to the all the users of the cloud provider 105 (action "A6.Expose"). Each monitoring template 450 (identified by a corresponding unique identifier) defines a corresponding type of monitoring event (for example, by means of a corresponding attribute—such as "event_type=vm_change_status" for the change of status of a virtual machine, "event_type=vm_metric_threshold" for the reaching of a threshold value by a metric of a virtual machine, "event_type=application change_status" for the change of status of a software application, and "event_type=application_metric_threshold" for the reaching of a threshold value by a metric of a software application); the monitoring template 450 may also comprise the definition of specific parameters of the type of monitoring event (for example, by means of corresponding attributes or key-value pairs—such as "key=new_vm_status/value=poweron|on|shutdown|reboot|off|boot_failed" for a change of status of a virtual machine, "app_name=myApplicationName" for the name of a software application to be monitored, "key=new_app_status/value=down|running|loading" for a change of status of a software application, "key=myMetric/value=myThreshold" for a default threshold value of a metric to be monitored).

Likewise, the administrator 405 uses the administration interface 410 for configuring notification templates 455 (for example, for injecting, modifying or deleting them). The notification templates 455 are stored in a corresponding catalogue, which is exposed to the all the users of the cloud provider 105 (action "A7.Expose"). Each notification template 455 (identified by a corresponding unique identifier) comprises a context section and an event section for a list of monitoring events, which are defined by keywords and placeholders for corresponding values. The context section defines a context wherein the monitoring events have been raised (for example, by means of corresponding attributes—such as "vm_id=myVmId" and "url=myURL" for a unique identifier and a URL, respectively, of the corresponding virtual machine). The event section then defines, for each monitoring event, its type (for example, by means of a corresponding attribute—such as "event_type=myEventType") and the values of relevant parameters (for example, by means of corresponding attributes or key/values pairs, such as "key=new_vm_status/value=myNewStatus" for a new status of a virtual machine, "app_name=myApplicationName" for the name of a software application under monitoring, "key=new_app_status/value=myNewStatus" for a new status of a software application, "key=myMetric" for a metric under monitoring, "value=myValue" for the value of a metric exceeding the corresponding threshold value, and "timestamp=myTimeStamp" for the raising time of the monitoring event).

Each monitoring template 450 is associated with a notification template 455 (for example, by means of a corresponding attribute—such as "notification_template=myNotificationTemplate")—with the same notification template 455 that may be associated with multiple monitoring templates 450.

At the same time, the user 425 may also submit requests for subscribing to the monitoring templates 450 (hereinafter referred to as monitoring requests) to the self-service interface 435 through the browser 430 (action "A8.Subscribe"). For this purpose, the user 425 selects one or more among his/her cloud resources (for example, virtual machines 420) and/or private resources (for example, software applications 457). For each selected (cloud or private) resource, the user 425 then selects a monitor template 450 (with the associated notification template 455), among the ones that are applicable thereto (i.e., for the type of the selected resource). In this phase, the user 425 may also customize some parameters of the selected monitoring template 450 (for example, the threshold value for the metric to be monitored). The self-service interface 435 is also used to specify a notification address (or more) of the user 425 for the notification of the monitoring events corresponding to the selected monitoring templates 450. The notification address may be either a default address for all the selected monitoring templates 450 of the user 425 or a specific address for each selected monitoring template 450; for example, the notification address may be a URL, an e-mail address, a mobile phone number, a pager number, and the like. Additional configuration options may also be available to the user 425 (for example, to define when and/or how the monitoring events have to be notified—such as, periodically or as soon as they are raised).

Monitoring requests submitted by the user 425 to the self-service interface 435 are forwarded to the request manager 440 as above. The monitoring request comprises the identifier of the selected monitoring template 450 (with possible customized values overriding the default values thereof), an identification of the corresponding selected resource (for example, the identifier and the URL of a virtual machine, and possibly the name of a software application running thereon) and the applicable notification address of the user 425. In this case, the request manager 440 invokes a notification manager 460 for performing the corresponding operations (action "A9.Invoke"). In response thereto, a new monitoring policy 465 is created by defining the corresponding monitoring event according to the type of monitoring event (from the selected monitoring template 450) and the selected resource (from the monitoring request), and by associating the notification address of the user 425 (from the monitoring request) therewith. The new monitoring policy 465 is stored into a corresponding repository (action "A10.Create"). Likewise, the user 425 may also use the self-service interface 435 (through the browser 430) to modify the selected monitoring templates 450 or to delete them (with the changes that are reflected into the corresponding monitoring policies 465).

A monitoring manager 470 applies each (newly created or modified) monitoring policy 465. Particularly, when the new monitoring policy 465 relates to a cloud resource that is managed by the cloud provider 105 directly (for example, a virtual machine 420) the monitoring manager 470 configures a global monitoring agent 475g running on the hypervisor 415 to monitor the corresponding monitoring event (action "A11.Configure"). For example, the global monitoring agent 475 periodically checks the status of the virtual machine 420 for detecting its change, or measures the desired metric of the virtual machine 420 (for example, its usage of the power processing, mass memory or working memory of the physical resources implementing it) to determine whether the corresponding threshold value is reached. Conversely, when the monitoring event relates to a private resource (under the control of the user 425 within a cloud resource thereof—for example, a software application 457 running on a virtual machine 420), the monitoring manager 470 may at first inject a private monitoring agent 475p (if necessary) within the cloud resource housing the private resource, such as the virtual machine 420 in which the software application 457 runs (action "A12.Inject"). In any case, the monitoring manager 470 then configures the private monitoring agent 475p to monitor the corresponding monitoring event. For example, the private monitoring agent 475p periodically checks the status of the software application 457 to detect a change or measures the desired metric of the software application 457 (for example, its usage of the power processing, mass memory or working memory of the virtual machine 420 housing it) for determining the reaching of the corresponding threshold value (action "A13.Configure").

Whenever a monitoring event is raised by the global monitoring agent 475g or by any private monitoring agent 475p, the corresponding (global or private) monitoring agent 475g, 475p returns event information relating to this monitoring event to the monitoring manager 470, which in turn passes it to the notification manager 460 (action "A14.Raise"). In response thereto, the notification manager 460 creates a notification message 480 for the monitoring event, according to the notification template 455 associated with the corresponding monitoring template 450 (as indicated in the corresponding monitoring policy 465) and the received event information. For this purpose, each placeholder of the notification template 455 is replaced with the corresponding value extracted from the event information— for example, "vm_id=myVmId" and "url=myURL" for the relevant virtual machine 420, "key=new_vm_status/value=myNewStatus" or "key=new_app_status/value=myNewStatus" for the new status of a virtual machine or of a software application, respectively, "key=myMetric/value=myValue" for the value of a metric exceeding the corresponding threshold value, and "timestamp=myTimeStamp" for the raising time of the monitoring event (Action "A15.Create"). The notification manager 460 then sends the notification message 480 so obtained to the notification address of the user 425, as indicated in the corresponding monitoring policy 465 (action "A16.Notify"). The notification may be achieved by means of a REST API, an e-mail message, an SMS, a pager message, and the like. The user 425 may then react to the notification message 480 by taking the appropriate steps for remedying the situation (either manually or automatically). Particularly, the user 425 may implement the API of the notification template 455 associated with each selected monitoring template 450, so as to react programmatically to each corresponding notification message 480 accordingly. For example, this API may have the following signature:

NotificationMessage(context, events[ ]).

An example of a corresponding notification message 480 (grouping three events of the same user 425 being raised in the last hour for a given virtual machine) is:

```
Context
    vm_id = myVmId
    url = myURL
events[ ]
    event_type = vm_change_status
    key = new_vm_status
    value = off
    timestamp = 20110620:111201
    event_type = vm_metric_threshold
    key = average_network_usage
    value = 60%
    timestamp = 20110620:112510
    event_type = application_change_status
    app_name = myApplicationName1
    key = new_app_status
    value = loading
    timestamp = 20110620:113213
```

-continued

```
    event_type = application_metric_threshold
    app_name = myApplicationName2
    key = average_CPU_usage
    value = 90%
    timestamp = 20110620:114738
```

Naturally, in order to satisfy local and specific requirements, a person skilled in the art may apply to the embodiments described above many logical and/or physical modifications and alterations. More specifically, although the embodiments have been described with a certain degree of particularity, it should be understood that various omissions, substitutions and changes in the form and details as well as other embodiments are possible (for example, with respect to numerical values). Particularly, different embodiments of the invention may even be practiced without the specific details set forth in the preceding description to provide a more thorough understanding thereof. Further, well-known features may have been omitted or simplified in order not to obscure the description with unnecessary particulars. Moreover, it is expressly intended that specific elements and/or method steps described in connection with any embodiments of may be incorporated in any other embodiment as a matter of general design choice.

In any case, the terms include, comprise, have and contain (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), and the term a/an should be intended as one or more items (unless expressly indicated otherwise).

For example, similar considerations apply if the same solution is implemented with an equivalent method (by using similar steps with the same functions of more steps or portions thereof, removing some steps being non-essential, or adding further optional steps). Moreover, the steps may be performed in a different order, concurrently or in an interleaved way (at least in part).

Moreover, the above-mentioned monitoring templates are merely illustrative, and in no way limitative. For example, with the possibility of defining monitoring templates for complex resources based on combinations of multiple cloud and/or private resources.

The possibility of injecting the private monitoring agent into each virtual machine when it is created (for its next activation when it is necessary) is not excluded.

The above-mentioned cloud resources and private resources are merely illustrative, and in no way limitative (for example, alternative cloud resources may be a virtual router and alternative private resources may be a configuration file).

The notification templates may have any other format; moreover, nothing prevents defining the format of the notification messages directly within the monitoring templates.

The monitoring of the private and/or cloud resources may also be based on any other strategy, such as with information that is collected periodically and not only when specific monitoring events are raised. As a consequence, the collected information may also be used in a different way, such as only for reporting purposes.

In any case, the above-mentioned monitoring events are merely illustrative and in no way limitative (for example, with the possibility of defining complex monitoring events based on combinations of multiple monitoring events, even relating to different cloud and/or private resources).

Nothing prevents having monitoring messages conforming to any other API (or more generally with any other format).

The described embodiments may be implemented as a stand-alone module, as a plug-in for the front-end component of the cloud-computing environment, or even directly in the front-end component itself. It would be readily apparent that it is also possible to deploy the described embodiments as a service. In any case, similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). The program may take any form suitable to be used by any data-processing system or in connection therewith (for example, within a virtual machine), thereby configuring the system to perform the desired operations. Particularly, the program may be in the form of external or resident software, firmware, or microcode (either in object code or in source code—for example, to be compiled or interpreted). Moreover, it is possible to provide the program on any computer-usable medium (and particularly as an article of manufacture on a non-transitory medium). The medium may be any element suitable to contain, store, communicate, propagate, or transfer the program. For example, the medium may be of the electronic, magnetic, optical, electromagnetic, infrared, or semiconductor type. Examples of such medium are fixed disks (where the program may be pre-loaded), removable disks, tapes, cards, wires, fibers, wireless connections, networks, broadcast waves, and the like. In any case, the described embodiments may be implemented with a hardware structure (for example, integrated in a chip of semiconductor material) or with a combination of software and hardware suitably programmed or otherwise configured.

Similar considerations apply if the cloud-computing environment has a different structure or comprises equivalent components, or it has other operative characteristics. In any case, every component thereof may be separated into more elements, or two or more components may be combined together into a singe element; moreover, each component may be replicated to support the execution of the corresponding operations in parallel. It is also pointed out that (unless specified otherwise) any interaction between different components generally does not need to be continuous, and it may be either direct or indirect through one or more intermediaries.

What is claimed is:

1. A method for monitoring resources in a cloud-computing environment, comprising:
   provisioning a set of cloud resources to a user of the cloud-computing environment;
   allocating a set of private resources to the user, each private resource being assigned within the set of cloud resources of the user;
   configuring monitoring templates, by an administration interface used by an administrator, for corresponding types of private resources and monitoring events, wherein each monitoring template of the monitoring templates provides specific parameters for a corresponding type of monitoring event and a corresponding type of private resource defined for the monitoring template;
   associating at least one of the monitoring templates with a notification template defining a format used to inform the user when a monitoring event for the monitoring template is raised according to a predefined program interface;
   storing the monitoring templates in a catalog;
   exposing the monitoring templates from the catalog, each for one of a plurality of corresponding types of a private resource allocated to the user, wherein each of the monitoring templates monitor for a monitoring event at the private resource of the corresponding type, and wherein the user subscribes to at least one of the monitoring templates to monitor at least one of the private resources of the user;
   receiving user subscription to at least one of the exposed monitoring templates, wherein each of the subscribed monitoring templates is for one of the private resources allocated to a subscribing user; and
   providing a private monitoring agent, within one of the cloud resources of the subscribing user housing the private resource of the subscribing user, to monitor the private resource according to a subscribed monitoring template.

2. The method of claim 1, wherein the providing the private monitoring agent to monitor the private resource comprises:
   injecting the private monitoring agent into the cloud resource housing the private resource to monitor; and
   configuring the private monitoring agent to monitor the private resource according to the subscribed monitoring template.

3. The method of claim 1, wherein at least one of the cloud resources comprises a virtual machine owned by the user, and at least one of the private resources comprises a software entity housed within the virtual machine of the user.

4. The method of claim 3, wherein the software entity is a software application running on the virtual machine.

5. The method of claim 1, further comprising:
   configuring a global monitoring agent to monitor each selected cloud resource according to a subscribed monitoring template.

6. The method of claim 1, further comprising:
   notifying the user of a result of the monitoring of the private resource according to the notification template associated with the subscribed monitoring template.

7. The method of claim 6, wherein each monitoring template comprises a specification of a type of monitoring event to be monitored for the corresponding type of the private resource, further comprising:
   detecting an occurrence of a monitoring event for the private resource being monitored;
   creating a notification message for the monitoring event according to the notification template associated with the monitoring template for the corresponding type of the monitoring event; and
   sending the notification message to the subscribing user.

8. The method of claim 7, wherein the monitoring event comprises change of status of the private resource or a reaching of a threshold value by a metric of the private resource being monitored.

9. The method of claim 7, wherein each notification message conforms to a predefined application program interface.

10. A computer program product comprising a non-transitory computer readable storage medium including code executed to monitor resources in a cloud computing environment and perform operations, the operations comprising:

provisioning a set of cloud resources to a user of the cloud-computing environment;

allocating a set of private resources to the user, each private resource being assigned within the set of cloud resources of the user;

configuring monitoring templates, by an administration interface used by an administrator, for corresponding types of private resources and monitoring events, wherein each monitoring template of the monitoring templates provides specific parameters for a corresponding type of monitoring event and a corresponding type of private resource defined for the monitoring template;

associating at least one of the monitoring templates with a notification template defining a format used to inform the user when a monitoring event for the monitoring template is raised according to a predefined program interface;

storing the monitoring templates in a catalog;

exposing the monitoring templates from the catalog, each for one of a plurality of corresponding types of a private resource allocated to the user, wherein each of the monitoring templates monitor for a monitoring event at the private resource of the corresponding type, and wherein the user subscribes to at least one of the monitoring templates to monitor at least one of the private resources of the user;

receiving user subscription to at least one of the exposed monitoring templates, wherein each of the subscribed monitoring templates is for one of the private resources allocated to a subscribing user; and providing a private monitoring agent, within one of the cloud resources of the subscribing user housing the private resource of the subscribing user, to monitor the private resource according to a subscribed monitoring template.

11. The computer program product of claim 10, wherein the providing the private monitoring agent to monitor the private resource comprises:

injecting the private monitoring agent into the cloud resource housing the private resource to monitor; and configuring the private monitoring agent to monitor the private resource according to the subscribed monitoring template.

12. The computer program product of claim 10, wherein at least one of the cloud resources comprises a virtual machine owned by the user, and at least one of the private resources comprises a software entity housed within the virtual machine of the user.

13. The computer program product of claim 12, wherein the software entity is a software application running on the virtual machine.

14. The computer program product of claim 10, further comprising:

configuring a global monitoring agent to monitor each selected cloud resource according to a subscribed monitoring template.

15. The computer program product of claim 10, wherein the operations further comprise:

notifying the user of a result of the monitoring of the private resource according to the notification template associated with the subscribed monitoring template.

16. The computer program product of claim 15, wherein each monitoring template comprises a specification of a type of monitoring event to be monitored for the corresponding type of private resource, further comprising:

detecting an occurrence of a monitoring event for the private resource being monitored;

creating a notification message for the monitoring event according to the notification template associated with the monitoring template for the corresponding type of the monitoring event; and sending the notification message to the subscribing user.

17. The computer program product of claim 16, wherein the monitoring event comprises change of status of the private resource or a reaching of a threshold value by a metric of the private resource being monitored.

18. A system to monitor resources in a cloud computing environment, comprising:

a processor; and a computer readable storage device having code executed by the processor to perform operations, the operations comprising:

provisioning a set of cloud resources to a user of the cloud-computing environment;

allocating a set of private resources to the user, each private resource being assigned within the set of cloud resources of the user;

configuring monitoring templates, by an administration interface used by an administrator, for corresponding types of private resources and monitoring events, wherein each monitoring template of the monitoring templates provides specific parameters for the corresponding type of monitoring event and the corresponding type of private resource defined for the monitoring template;

associating at least one of the monitoring templates with a notification template defining a format used to inform the user when a monitoring event for the monitoring template is raised according to a predefined program interface;

storing the monitoring templates in a catalog;

exposing the monitoring templates from the catalog, each for one of a plurality of corresponding types of a private resource allocated to the user, wherein each of the monitoring templates monitor for a monitoring event at the private resource of the corresponding type, and wherein the user subscribes to at least one of the monitoring templates to monitor at least one of the private resources of the user;

receiving user subscription to at least one of the exposed monitoring templates, wherein each of the subscribed monitoring templates is for one of the private resources allocated to a subscribing user; and providing a private monitoring agent, within the cloud resources of the subscribing user housing the private resource of the subscribing user, to monitor the private resource according to a subscribed monitoring template.

19. The system of claim 18, wherein the providing the private monitoring agent to monitor the private resource comprises:

injecting the private monitoring agent into the cloud resource housing the private resource to monitor; and configuring the private monitoring agent to monitor the private resource according to the subscribed monitoring template.

20. The system of claim 18, wherein at least one of the cloud resources comprises a virtual machine owned by the user, and at least one of the private resources comprises a software entity housed within the virtual machine of the user.

21. The system of claim 20, wherein the software entity is a software application running on the virtual machine.

22. The system of claim 18, further comprising:
configuring a global monitoring agent to monitor each selected cloud resource according to a selected monitoring template.

23. The system of claim 18, wherein the operations further comprise:
notifying the subscribing user of a result of the monitoring of the private resource according to the notification template associated with the subscribed monitoring template.

24. The system of claim 23, wherein each monitoring template comprises a specification of a type of monitoring event to be monitored for the corresponding type of the private resource, wherein the operations further comprise:
detecting an occurrence of a monitoring event for private resource;
creating a notification message for the monitoring event according to the notification template associated with the monitoring template for the corresponding type of the monitoring event; and
sending the notification message to the subscribing user.

25. The system of claim 24, wherein the monitoring event comprises change of status of the private resource or a reaching of a threshold value by a metric of the private resource being monitored.

* * * * *